(No Model.) 2 Sheets—Sheet 1.

C. J. MOBER.
GRAIN CLEANER.

No. 552,769. Patented Jan. 7, 1896.

Witnesses.
J. Jessen.
Richard Paul

Inventor.
Charles J. Mober.
By Paul & Hawley Attorneys.

(No Model.) 2 Sheets—Sheet 2.

C. J. MOBER.
GRAIN CLEANER.

No. 552,769. Patented Jan. 7, 1896.

Witnesses.
J. Jessen
Richard Paul

Inventor.
Charles J. Mober.

By Paul & Hawley attorneys

UNITED STATES PATENT OFFICE.

CHARLES J. MOBER, OF MINNEAPOLIS, MINNESOTA.

GRAIN-CLEANER.

SPECIFICATION forming part of Letters Patent No. 552,769, dated January 7, 1896.

Application filed November 17, 1894. Serial No. 529,114. (No model.)

*To all whom it may concern:*

Be it known that I, CHARLES J. MOBER, of Minneapolis, county of Hennepin, State of Minnesota, have invented certain new and useful Improvements in Grain-Cleaners, of which the following is a specification.

My invention relates to improvements in grain-cleaners, and is designed as an improvement over the machine shown and described in the patent numbered 520,653, granted to me May 9, 1894, and the object I have in view is not only to provide means for removing the straw, dust and impurities from the grain as it passes through the machine, but also to provide means for separating the light grain from the heavier and delivering it to the proper receptacle outside of the machine.

To this end my invention consists generally in the construction and combination hereinafter described and particularly pointed out in the claim, and which will be more clearly understood by reference to the accompanying drawings, forming part of this specification, in which—

Figure 1:
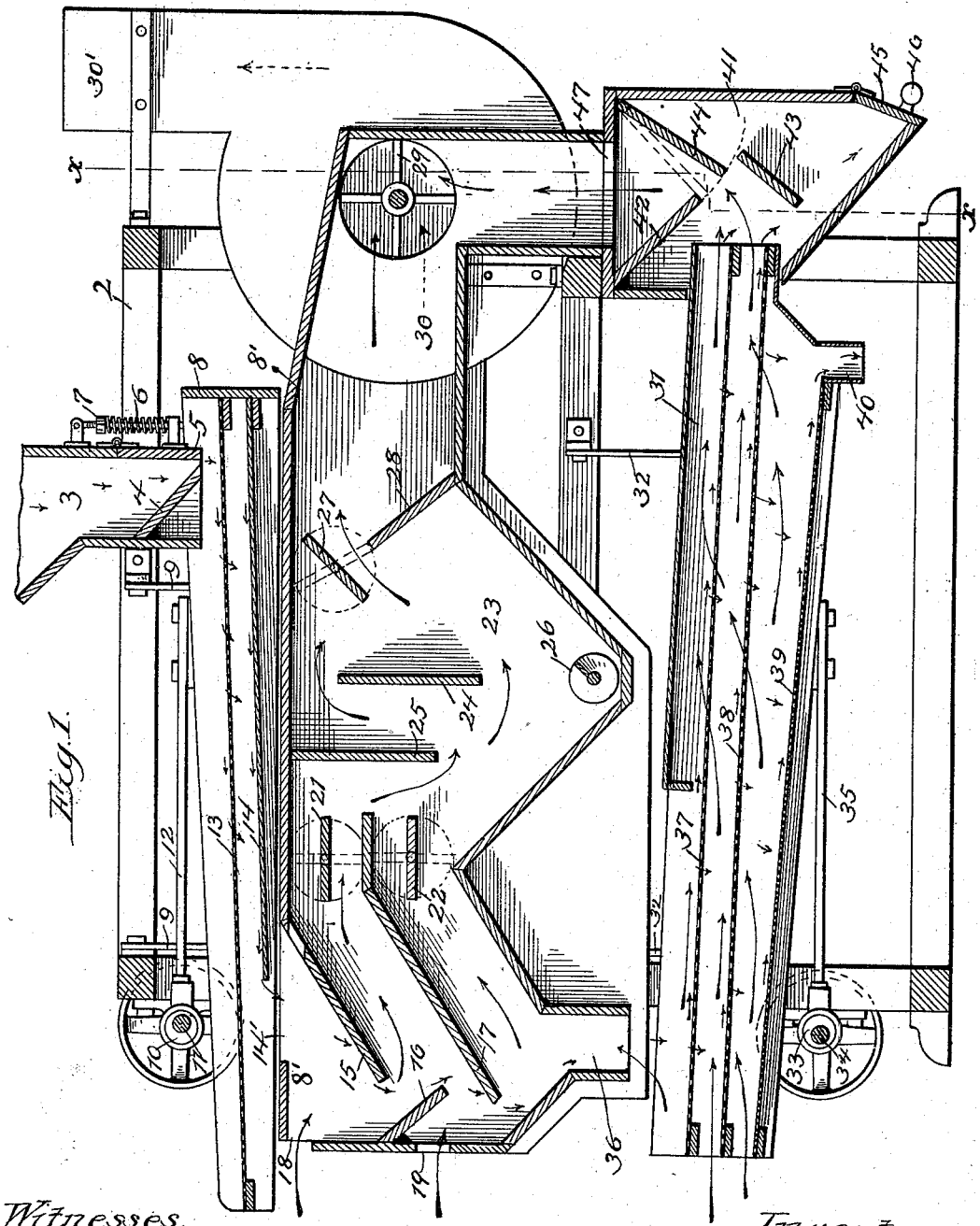
Figure 2:
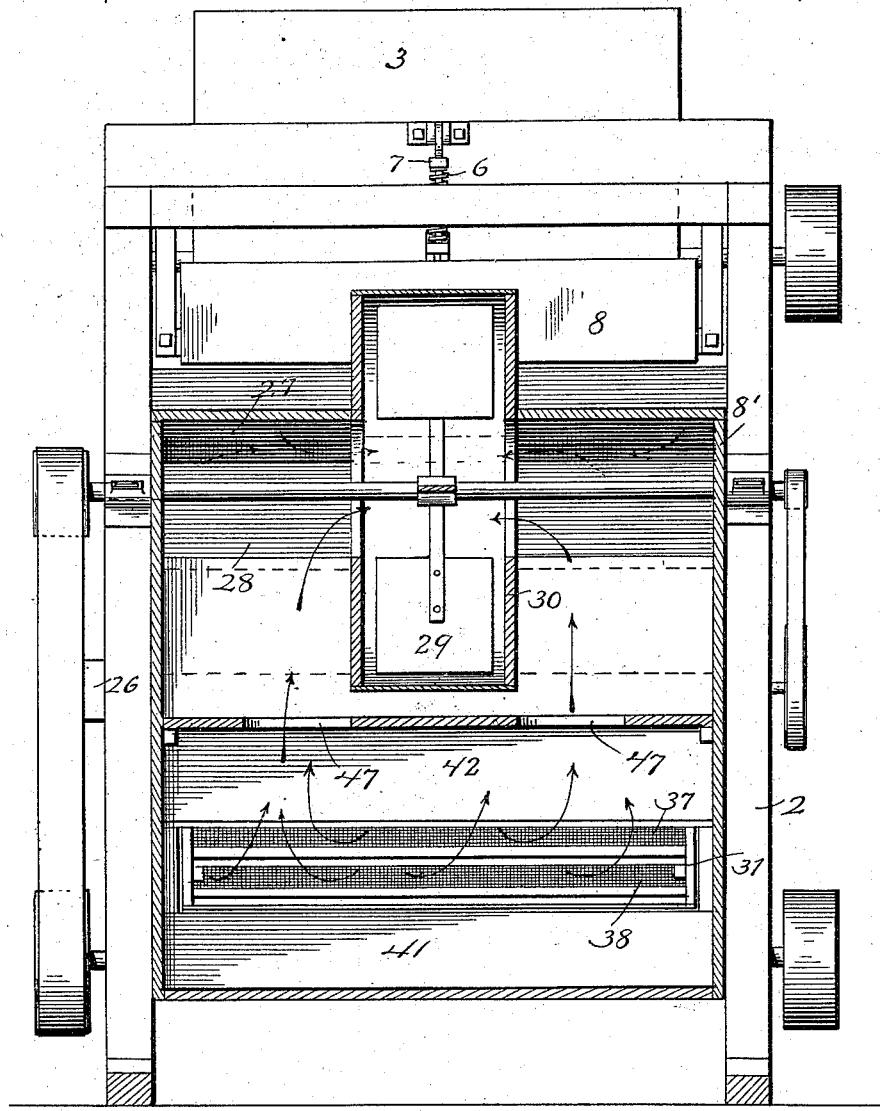

Figure 1 is a longitudinal vertical section of a grain-cleaner embodying my invention. Fig. 2 is a vertical transverse section on the line *x x* of Fig. 1.

In the drawings, 2 represents a frame of a grain-cleaner of any suitable size provided with a spout or hopper 3, through which the material is fed to the machine. A partition or board 4 is arranged at an incline in the hopper to direct the material to one side thereof, and a hinged flap or door 5 is provided in this side of the hopper to be pressed out by the weight of the material in the hopper, so as to allow the material to fall through upon the sieve beneath. A spring 6 is arranged between the hinged door and hopper and is provided with an adjusting-nut 7, whereby the tension of the spring may be adjusted and the flow of the material from the hopper regulated. Below the hopper is suspended the sieve-frame 8, supported by the hanger-straps 9 from the frame of the machine, and connected with an eccentric 10 upon a shaft 11 by a shaker-rod 12. The hangers 9 are hung loosely on the frame of the machine to permit an oscillating movement of the sieve-frame when the shaft is revolved. The material falls from the hopper upon the sieve 13 at the head of the sieveframe. The grain, dust and small impurities pass through the sieve upon the inclined board 14 beneath the sieve, while the straw and coarse impurities are moved over the sieve to the tail thereof and fall upon the ground.

The motion of the sieve-frame causes the grain to move along the inclined board or plate from which it falls through an opening 14' provided in a casing 8', which extends the entire length of the machine and is provided with a fan 29 in a casing 30, which communicates with the outside air by the discharge-pipe 30'. As the material falls through the opening 14' it strikes the inclined plates or partitions 15, 16, and 17 arranged in the casing 8'. As the grain falls from one plate or partition to another in a thin sheet it is subjected to currents of air which enter the casing through openings 18 and 19 in the end wall thereof and created by the fan 29.

The bottom of the casing projects upwardly at the point, and between the highest point of the extension and the upper side of the casing the valves 21 and 22 are arranged, one on each side of the plate or partition 17. By means of these valves the current of air may be regulated. Beyond the valves 21 and 22 is a settling or expansion chamber 23. In this chamber is arranged the transverse partition 24 and the depending partition 25, against which the current of air carrying the dust and fine material strikes and is thereby directed to the bottom of the settling-chamber, where the dust falls into the conveyer 26 and is carried out of the machine. In the upper part of the settling-chamber in the passage leading to the fan is a third valve 27 arranged between an inclined partition 28 and the upper wall of the casing. The current of air is drawn through the machine into the fan-casing through openings in the sides thereof, and is then discharged at the top of the machine.

Below the casing 8' and extending the full length of the machine is a second sieve-frame 31 supported upon swinging hangers 32 and connected with an eccentric 33 upon a shaft 34 by a rod 35, whereby an oscillating motion will be imparted to the sieve-frame when the shaft is revolved.

The casing 8' is provided with an opening 36 through which the grain falls upon the inclined sieve 37 arranged in the sieve-frame 31 and at the upper side thereof. This end of the sieve-frame is open to permit a current of air created by the fan to pass over the sieve. Beneath the sieve 37 is arranged a second sieve 38, also inclined, and still another but finer-woven sieve 39 is arranged beneath the sieve 38.

The space above and below the sieve 38 is open to admit a current of air which passes along the sieve-frame and up through the meshes of the sieve, thereby lifting up the lighter grain and keeping it above the heavier and aided by the motion of the sieve-frame moving it along over the two upper sieves to the farther ends thereof beneath the fan-casing.

The heavier grain, such as wheat, passes through the sieves 37 and 38 and falls upon the finer sieve 39, the meshes of which are coarse enough to allow sand and other fine foreign matter to pass through, but are too fine to permit the passage of heavier grain, such as wheat. It is therefore moved along by the motion of the sieve-frame to the lower end of the sieve, from which it falls through the spout 40 into a receptacle arranged beneath.

Arranged directly beneath the fan-casing and having an opening in its side wall through which projects the end of the sieve-frame 31 is a box or hopper 41 provided with the transverse partition 42, the narrow deflecting-partition 43, and the hinged flap or door 44, by means of which the current of air over the sieves is regulated. The bottom of the box or hopper is inclined and a hinged door 45 is arranged in the side of the hopper opposite the inclined bottom. This door is normally held shut by the weight 46 fastened to the lower edge thereof and arranged to be pushed out by the weight of the grain in the hopper or box 41.

Two openings 47 are provided in the top of the box or hopper, one on each side of the machine, through which the current of air passes from the sieves to the fan, as shown in Fig. 2.

The operation of the machine is as follows: The material is fed into the hopper 3 and falls down upon the sieve 13 below. The straw and large particles of foreign matter pass over the tail of the sieve, while the grain passes through and falls upon the inclined board or plate 14, and from thence falls through the opening 14' in a thin sheet upon the inclined partitions 15, 16, and 17, arranged in the casing 8'. The current of air passing through the thin sheet of grain lifts the dust and fine particles of foreign matter out and carries it over onto the settling-chamber 23, where it is deposited in the conveyer 26. The grain then falls down through the opening 36 upon the sieve 37, through which a current of air is passing constantly. This current of air tends to lift the lighter grain, such as oats, and prevents it from turning up on end and passing through the sieve. If any of the lighter grains do pass through they fall upon the sieve 38, where they are subjected again to a current of air and are moved along by the motion of the sieve-frame until they reach the lower end of the sieve-frame, and from thence they fall into the hopper or box 41. The heavier grain, such as wheat, falls through upon the fine sieve 39, which allows the sand and fine particles of foreign matter to pass through but carries the wheat along to the lower end of the sieve, where it falls through the opening 40 into a receptacle beneath. By means of the valve 44 the current of air may be regulated as desired.

Having thus described my invention, I claim as new and desire to secure by Letters Patent—

In a machine of the class described, the combination with the casing 8', of the fan arranged at one end thereof and connected therewith by a suitable air trunk, the vertical air trunk 36 provided in the opposite end of said casing, the sieve frame beneath said casing, the hopper 41 arranged beneath said fan and connected therewith by a vertical air trunk 47, said hopper being provided at one end with an opening to receive the end of said sieve frame, the coarse sieves 37 and 38 arranged in said frame in position to receive the material falling through said air trunk 36, the fine sieve 39 beneath said sieves 37 and 38, the spout 40 provided in said sieve frame to receive the fine material from said sieve 39, the partition 42 arranged in said hopper near said air-trunk 47, the valve 44 for regulating the passage of air through said air-trunk and over and through said sieves, the partition 43 at the end of said sieves in said hopper, and the door provided in the lower end of said hopper, for the purpose set forth.

In testimony whereof I have hereunto set my hand this 9th day of October, A. D. 1894.

CHARLES J. MOBER.

In presence of—
RICHARD PAUL,
A. C. PAUL.